United States Patent
Schneider et al.

(10) Patent No.: US 9,342,705 B1
(45) Date of Patent: May 17, 2016

(54) SYSTEMS AND METHODS FOR SEARCHING SHARED ENCRYPTED FILES ON THIRD-PARTY STORAGE SYSTEMS

(71) Applicant: Symantec Corporation, Mountain View, CA (US)

(72) Inventors: Scott Schneider, Sun Valley, CA (US); Walter Bogorad, Danville, CA (US); Haibin Zhang, Davis, CA (US); Sharada Sundaram, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 63 days.

(21) Appl. No.: 14/199,158

(22) Filed: Mar. 6, 2014

Related U.S. Application Data

(60) Provisional application No. 61/926,555, filed on Jan. 13, 2014.

(51) Int. Cl.
  *G06F 21/62* (2013.01)
  *G06F 17/30* (2006.01)

(52) U.S. Cl.
  CPC ...... *G06F 21/6218* (2013.01); *G06F 17/30864* (2013.01); *G06F 17/30109* (2013.01); *G06F 17/30949* (2013.01); *G06F 21/6227* (2013.01)

(58) Field of Classification Search
  CPC .......... G06F 21/6227; G06F 17/30109; G06F 17/30949
  USPC ....................................................... 713/165
  See application file for complete search history.

(56) References Cited

U.S. PATENT DOCUMENTS

| | | | |
|---|---|---|---|
| 8,176,334 B2 * | 5/2012 | Vainstein | G06F 21/6218 713/165 |
| 8,401,185 B1 | 3/2013 | Telang | |
| 8,458,494 B1 * | 6/2013 | Bogorad | H04L 9/30 380/282 |
| 8,533,489 B2 * | 9/2013 | Roeder et al. | 713/189 |
| 2005/0157880 A1 | 7/2005 | Kurn et al. | |
| 2007/0266258 A1 | 11/2007 | Brown et al. | |
| 2008/0133935 A1 * | 6/2008 | Elovici et al. | 713/193 |
| 2009/0300712 A1 | 12/2009 | Kaufmann et al. | |
| 2010/0095118 A1 | 4/2010 | Meka | |

(Continued)

OTHER PUBLICATIONS

Goh, Eu-Jin; Secure Indexes, May 5, 2004, stanford.edu, pp. 1-19, retreived from http://crypto.stanford.edu/~eujin/papers/secureindex/secureindex.pdf on Jun. 24, 2015.*

(Continued)

*Primary Examiner* — Carl Colin
*Assistant Examiner* — Gary Lavelle
(74) *Attorney, Agent, or Firm* — ALG INTELLECTUAL PROPERTY, LLC

(57) ABSTRACT

A computer-implemented method for searching shared encrypted files on third-party storage systems may include (1) receiving, at a server-side computing system, a request from a user to search at least one encrypted file to which a group of users that includes the user shares access, (2) identifying, in response to the request, at least one encrypted search index compiled for and shared by the group of users that enables the encrypted file to be searched, (3) decrypting the encrypted search index with a key with which each user within the group of users has access, and (4) using the decrypted search index to respond to the request from the user. Various other methods, systems, and computer-readable media are also disclosed.

20 Claims, 12 Drawing Sheets

(56) References Cited

U.S. PATENT DOCUMENTS

2015/0143112 A1* 5/2015 Yavuz et al. .................. 713/165
2015/0161410 A1* 6/2015 Andersen ............ H04L 63/0457
                                                          713/165

OTHER PUBLICATIONS

Reza Curtmola, Juan Garay, Seny Kamara, Rafail Ostrovsky, Searchable Symmetric Encryption: Improved Definitions and Efficient Constructions, Oct. 30, 2006, ACM Conference on Computer and Communications Security, pp. 1-33, downloaded from https://eprint.iacr.org/s006/210.pdf on Jun. 28, 2015.*
Fanglu Guo, et al; Systems and Methods for Validating Ownership of Deduplicated Data; U.S. Appl. No. 13/314,496, filed Dec. 8, 2011.
Anthony Langsworth; Systems and Methods for Encoding Data; U.S. Appl. No. 13/240,959, filed Sep. 22, 2011.
Srinivas Chenna; Systems and Methods for Transferring Authentication Credentials; U.S. Appl. No. 13/483,835, filed May 30, 2012.
Steve Chazin, et al; Systems and Methods for Sharing Data Stored on Secure Third-Party Storage Platforms; U.S. Appl. No. 13/952,487, filed Jul. 26, 2013.
Kamara, Seny et al., "Cryptographic Cloud Storage", http://research.microsoft.com/en-us/people/klauter/cryptostoragerlcps.pdf, as accessed Jan. 7, 2014, Workshop on Real-Life Cryptographic Protocols and Standardization, 2010.
Rogaway, Phillip et al., "The Security of Ciphertext Stealing", http://www.cs.ucdavis.edu/~rogaway/papers/steal.pdf, as accessed Jan. 7, 2014, 19th International Workshop on Fast Software Encryption, FSE 2012, Washington, D.C., USA, (Mar. 20, 2012).
Deb Banerjee; Systems and Methods for Scanning Data Stored on Cloud Computing Platforms; U.S. Appl. No. 13/925,357, filed Jun. 24, 2013.
Walter Bogorad, et al.; Systems and Methods for Secure Third-Party Data Storage; U.S. Appl. No. 14/092,757, filed Nov. 27, 2013.
"lucenetransform", https://code.google.com/p/lucenetransform/, as accessed Jan. 7, 2014, (Nov. 20, 2011).
"Dropbox", http://www.dropbox.com, as accessed Jan. 7, 2014, (Dec. 26, 1996).
Haibin Zhang, et al.; Systems and Methods for Maintaining Encrypted Search Indexes on Third-Party Strorage Systems; U.S. Appl. No. 14/199,240, filed Mar. 6, 2014.
Haibin Zhang, et al.; Systems and Methods for Securing Data at Third-Party Storage Services; U.S. Appl. No. 14/199,339, filed Mar. 6, 2014.
"Solr", http://lucene.apache.org/solr/, as accessed Jan. 7, 2014, The Apache Software Foundation, (Jan. 19, 2007).
"Lucene", http://lucene.apache.org/, as accessed Jan. 7, 2014, The Apache Software Foundation, (Feb. 16, 2005).
Kamara, Seny et al., "Cryptographic Cloud Storage", Proceedings of Financial Cryptography: Workshop on Real-Life Cryptographic Protocols and Standardization (RLCPS '10), (Jan. 2010).

* cited by examiner

SYSTEMS AND METHODS FOR SEARCHING SHARED ENCRYPTED FILES ON THIRD-PARTY STORAGE SYSTEMS

CROSS REFERENCE TO RELATED APPLICATION

This application claims the benefit of U.S. Provisional Application No. 61/926,555, filed 13 Jan. 2014, the disclosure of which is incorporated, in its entirety, by this reference.

BACKGROUND

Organizations and consumers increasingly use third-party services to store data. Third-party storage services may provide a number of benefits to customers, including flexibility, low capitalization requirements, add-on services, data sharing, and centralized access to data.

Many third-party storage customers want or need their data to be stored in an encrypted state due to privacy concerns or in order to ensure compliance with internal or external data-protection requirements, such as governmental laws and regulations, partnership agreements with other organizations, etc. As such, many traditional third-party storage services store customer data in an encrypted state.

While some conventional third-party storage services may create search indexes (e.g., keyword indexes) that enable a customer to search encrypted documents to which the customer has access, the mechanisms used by such conventional services to maintain search indexes may present unwanted limitations. For example, if a third-party storage service creates a separate search index for each of its customers and customers are allowed to share files, the third-party storage service may create many search indexes that contain duplicate information. In addition, if search indexes are not properly secured, they may reveal all or a portion of the private data contained in the documents that they index to other customers, intruders, and/or administrators of the third-party storage service. Accordingly, the instant disclosure identifies and addresses a need for additional and improved systems and methods for searching shared encrypted files on third-party storage systems.

SUMMARY

As will be described in greater detail below, the instant disclosure describes various systems and methods for searching shared encrypted files on third-party storage systems using one or more search indexes compiled for a group of users that share access to the encrypted files. In one example, a computer-implemented method for searching shared encrypted files on third-party storage systems may include (1) receiving, at a server-side computing system, a request from a user to search an encrypted file to which a group of users that includes the user shares access, (2) identifying, in response to the request, an encrypted search index compiled for and shared by the group of users that enables the encrypted file to be searched, (3) decrypting the encrypted search index with a key with which each user within the group of users has access, and (4) using the decrypted search index to respond to the request from the user.

In some embodiments, the user may be a member of at least one additional group of users, the additional group of users may share access to at least one additional encrypted file, and each user within the additional group of users may have access to an additional key with which an additional encrypted search index may be decrypted. In such embodiments, the request from the user may include a request to search the encrypted file and the additional encrypted file, the step of identifying the encrypted search index may include identifying the additional encrypted search index compiled for and shared by the additional group of users that enables the additional encrypted file to be searched, the step of decrypting the encrypted search index may include decrypting the additional encrypted search index with the additional key, and the step of using the decrypted search index to respond to the request from the user may include using the decrypted search index and the additional decrypted search index to respond to the request from the user.

In some embodiments, the computer-implemented method may further include compiling the encrypted search index by (1) identifying every encrypted file to which every user in the group of users shares access, (2) compiling a search index for searching every encrypted file to which every user in the group of users shares access, and (3) encrypting, with the key, the search index for searching every encrypted file to which every user in the group of users shares access.

In one embodiment, the search index for searching every encrypted file to which every user in the group of users shares access may be the only search index for searching each encrypted file to which every user in the group of users shares access.

In some embodiments, the computer-implemented method may further include compiling the encrypted search index by (1) identifying a plurality of encrypted files to which an additional user in the group of users has access and to which the user does not have access, (2) compiling a search index for searching the plurality of encrypted files, and (3) encrypting, with the key, the search index for searching the plurality of encrypted files.

In one embodiment, the request from the user may include a keyword, and the step of using the decrypted search index to respond to the request from the user may include (1) using the decrypted search index to determine that the encrypted file contains the keyword, (2) ensuring that the user has access to the encrypted file, (3) responding to the request from the user with information about the encrypted file and/or the encrypted file.

In one embodiment, the computer-implemented method may further include (1) identifying an additional file to which the user shares access with an additional user, (2) compiling a first additional search index for searching the additional encrypted file, (3) compiling a second additional search index for searching the additional encrypted file, (4) encrypting the first additional search index with a first additional key to which the user but not the additional user has access, (5) encrypting the second additional search index with a second additional key to which the additional user but not the user has access, and (6) using the encrypted first additional search index to respond to the request from the user.

In some embodiments, the computer-implemented method may further include compiling the encrypted search index by (1) identifying a plurality of encrypted files to which the group of users shares access (e.g., a plurality of encrypted files that includes the encrypted file), (2) identifying a plurality of keywords that may be contained in the plurality of encrypted files, and (3) generating an encrypted multi-tenant search index for searching the plurality of encrypted files by (i) identifying, for at least one keyword in the plurality of keywords, a list of encrypted files in the plurality of encrypted files that contain the keyword, (ii) encrypting the list of encrypted files with the key, and (iii) storing the encrypted list of encrypted files in the encrypted multi-tenant search index such that the encrypted list of encrypted files can be identified using a lookup key generated based at least in part on the keyword and the group of users (e.g., the key to which each user in the group of users has access).

In some embodiments, the step of compiling the encrypted search index may further include (1) identifying an additional plurality of encrypted files to which an additional group of users shares access and (2) identifying an additional plurality of keywords that are contained in at least one of the additional plurality of encrypted files. In such embodiments the step of generating the encrypted multi-tenant search index may further include (1) identifying, for at least one additional keyword in the additional plurality of keywords, an additional list of encrypted files from the additional plurality of encrypted files that contain the additional keyword, (2) encrypting the additional list of encrypted files with an additional key to which each user in the additional group of users shares access, and (3) storing the additional encrypted list of encrypted files in the encrypted multi-tenant search index such that the additional encrypted list of encrypted files can be identified using an additional lookup key generated based at least in part on the additional keyword and the additional group of users.

In one embodiment, the lookup key may be generated using a pseudo-random function, the keyword, and the key. In some embodiments, the encrypted list of encrypted files may be stored in a hash table and accessed using the lookup key. In at least one embodiment, the encrypted search index may be encrypted using a mode of operation with a randomized counter.

In one embodiment, a system for implementing the above-described method may include (1) a receiving module that receives, at a server-side computing system, a request from a user to search at least one encrypted file to which a group of users that includes the user shares access, (2) an identifying module that identifies, in response to the request, an encrypted search index compiled for and shared by the group of users that enables the encrypted file to be searched, (3) a decrypting module that decrypts the encrypted search index with a key with which each user within the group of users has access, (4) a searching module that uses the decrypted search index to respond to the request from the user, and (5) at least one processor configured to execute the receiving module, the identifying module, the decrypting module, and the searching module.

In some embodiments, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive, at a server-side computing system, a request from a user to search at least one encrypted file to which a group of users that includes the user shares access, (2) identify, in response to the request, an encrypted search index compiled for and shared by the group of users that enables the encrypted file to be searched, (3) decrypt the encrypted search index with a key with which each user within the group of users has access, and (4) use the decrypted search index to respond to the request from the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
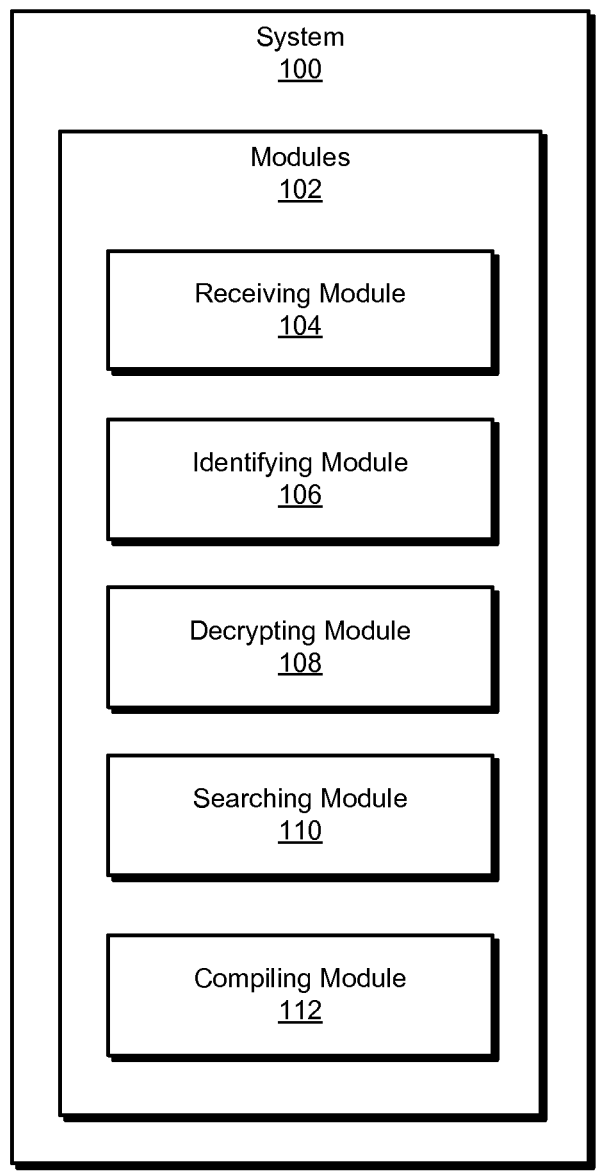
FIG. 1 is a block diagram of an exemplary system for searching shared encrypted files on third-party storage systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for searching shared encrypted files on third-party storage systems. As will be explained in greater detail below, by creating a search index for searching one or more encrypted files to which a group of users shares access and enabling each user in the group of users to access the search index, the systems and methods described herein may reduce the number of search indexes that are used to search encrypted files on third-party storage systems. Furthermore, in some examples, by maintaining large multi-tenant search indexes and limiting access to the multi-tenant search indexes using cryptographic keys that are shared by groups of users, these systems and methods may enable secure indexing and searching of shared encrypted files. Embodiments of the instant disclosure may also provide various other advantages and features, as discussed in greater detail below.

Figure 2:
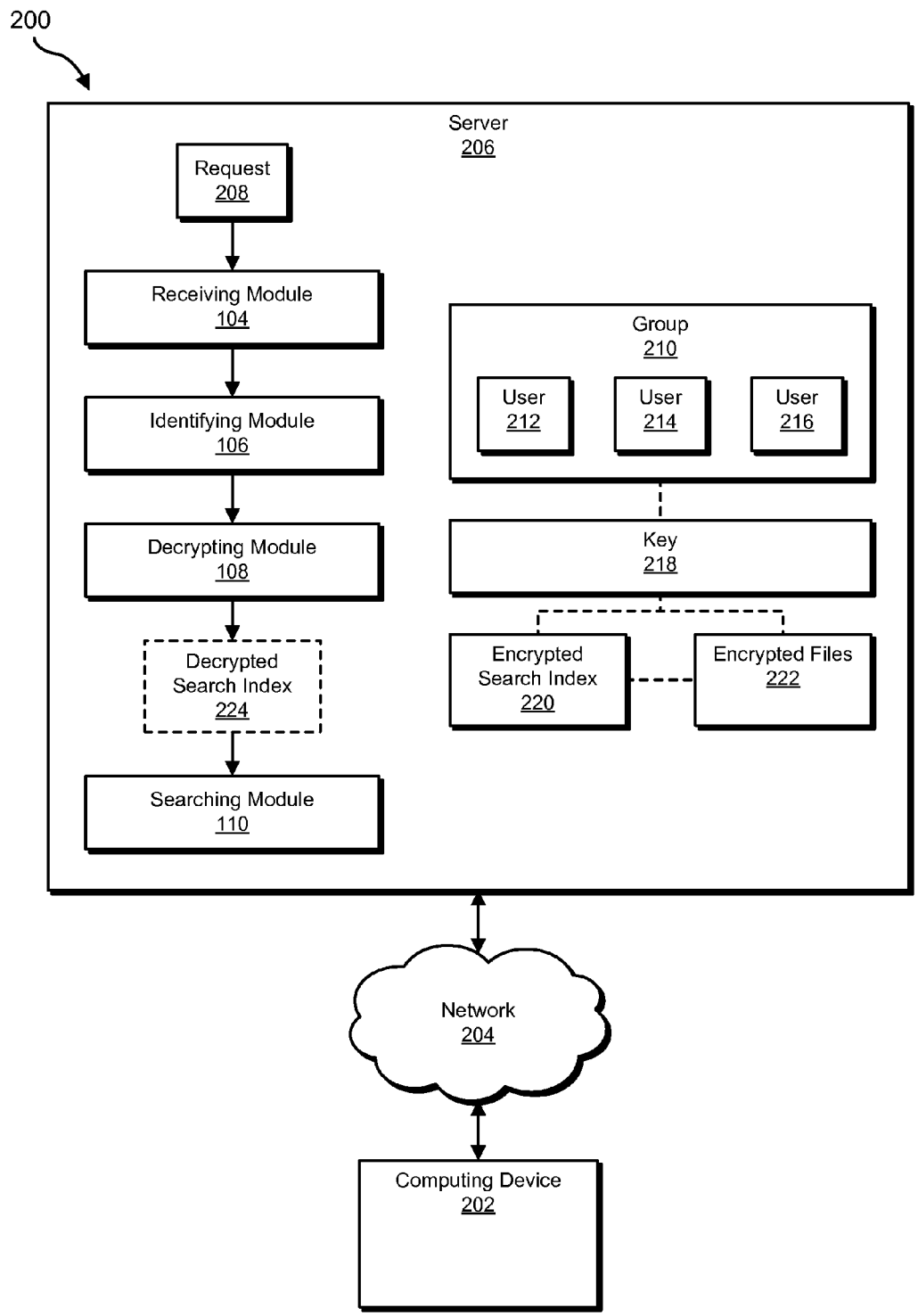
FIG. 2 is a block diagram of an additional exemplary system for searching shared encrypted files on third-party storage systems.

The following will provide, with reference to FIGS. 1-2, detailed descriptions of exemplary systems for searching shared encrypted files on third-party storage systems. Detailed descriptions of corresponding computer-implemented methods will also be provided in connection with FIGS. 3-10. In addition, detailed descriptions of an exemplary computing system and network architecture capable of implementing one or more of the embodiments described herein will be provided in connection with FIGS. 11 and 12, respectively.

FIG. 1 is a block diagram of an exemplary system 100 for searching shared encrypted files on third-party storage systems. As illustrated in this figure, exemplary system 100 may include one or more modules 102 for performing one or more tasks. For example, and as will be explained in greater detail below, exemplary system 100 may include a receiving module 104 that receive, at a server-side computing system, a request from a user to search at least one encrypted file to which a group of users that includes the user shares access. Exemplary system 100 may also include an identifying module 106 that identifies, in response to the request, an encrypted search index compiled for and shared by the group of users that enables the encrypted file to be searched. Exemplary system 100 may further include a decrypting module 108 that decrypts the encrypted search index with a key with which each user within the group of users has access.

In addition, and as will be described in greater detail below, exemplary system 100 may include a searching module 110 that uses the decrypted search index to respond to the request from the user. Exemplary system 100 may further include a compiling module 112 that compiles the encrypted search index. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 1110 in FIG. 11, and/or portions of exemplary network architecture 1200 in FIG. 12. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to efficiently search shared encrypted files on secure third-party storage systems. For example, and as will be described in greater detail below, one or more of modules 102 may cause computing device 202 and/or server 206 to (1) receive, at server 206, a request from user 212 (e.g., a user of computing device 202) to search encrypted files 222 to which group 210 shares access, (2) identify, in response to the request, encrypted search index 220 compiled for and shared by group 210 that enables encrypted files 222 to be searched, (3) generate decrypted search index 224 by decrypting encrypted search index 220 with key 218 (e.g., a key with which each user within group 210 has access and with which encrypted search index 220 may be decrypted), and (4) use decrypted search index 224 to respond to the request from user 212.

Computing device 202 and server 206 generally represents any type or form of computing device capable of reading computer-executable instructions. Examples of computing device 202 and server 206 include, without limitation, servers, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 1110 in FIG. 11, or any other suitable computing device.

In at least one example, computing device 202 may represent a user's computing device with which the user may access data stored on a third-party storage system. In some examples, computing device 202 may represent a client system that may be owned and/or administrated by an entity distinct from an owner and/or administrator of the third-party storage system. In at least one example, server 206 may represent at least a portion of a third-party storage system.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1200 in FIG. 12, or the like. Network 204 may facilitate communication or data transfer using wireless or wired connections. In one embodiment, network 204 may facilitate communication between computing device 202 and server 206.

Figure 3:
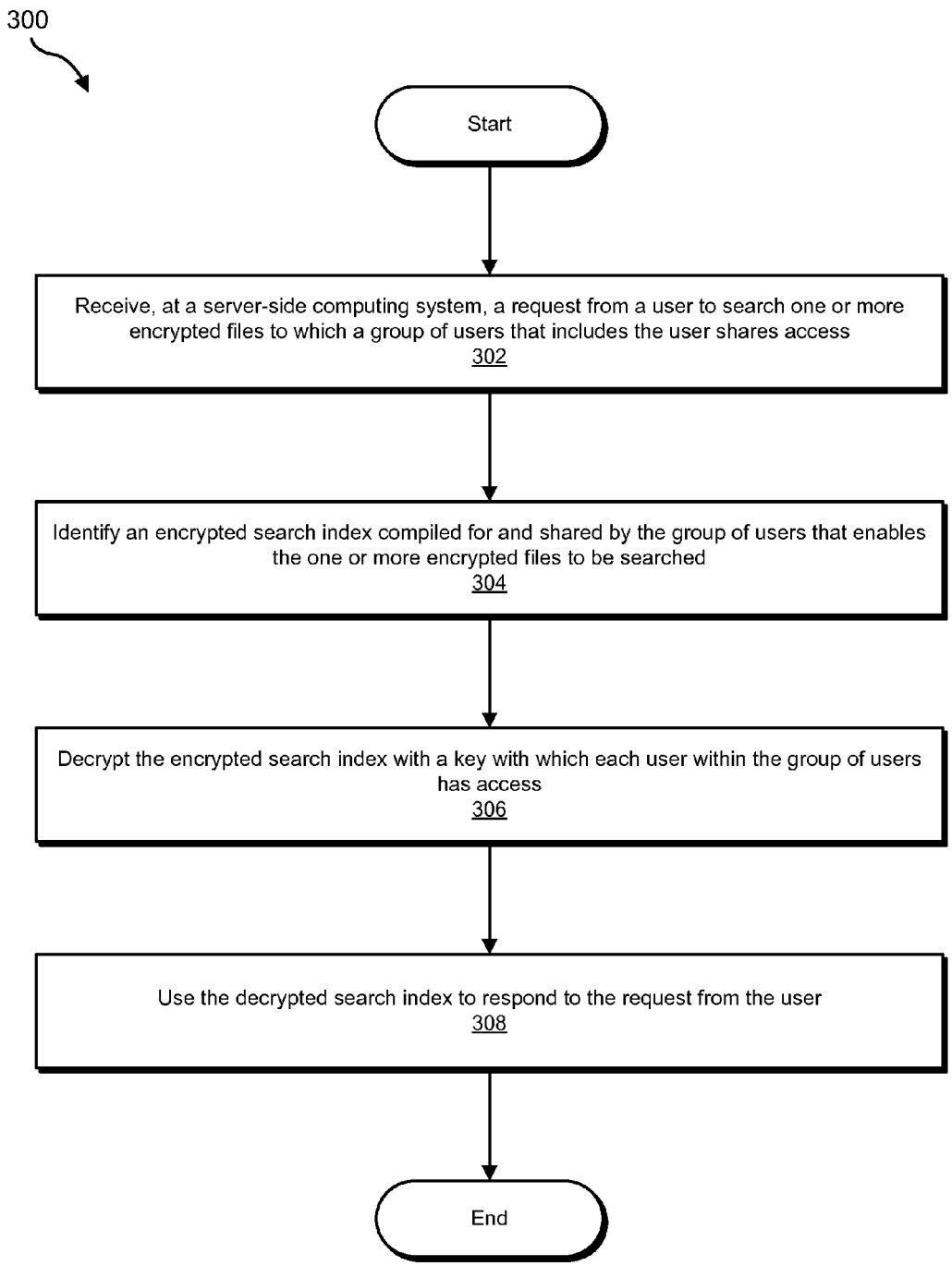
FIG. 3 is a flow diagram of an exemplary method for searching shared encrypted files on third-party storage systems.

FIG. 3 is a flow diagram of an exemplary computer-implemented method 300 for searching shared encrypted files on third-party storage systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1110 in FIG. 11, and/or portions of exemplary network architecture 1200 in FIG. 12.

As illustrated in FIG. 3, at step 302 one or more of the systems described herein may receive, at a server-side computing system, a request from a user to search one or more encrypted files to which a group of users that includes the user shares access. For example, receiving module 104 may, as part of server 206 in FIG. 2, receive request 208 from user 212 to search encrypted files 222 to which group 210 shares access.

The systems described herein may perform step 302 in a variety of contexts. In one example, receiving module 104 may receive a request from a user to search each encrypted file to which the user has access, where one of the encrypted files accessible to the user is also accessible to another user. Using FIG. 4 as an example, receiving module 104 may receive a request from user 420 to search encrypted files 422 to which user 420 has access. In this example, user 420 shares access to encrypted files 402 and 404 with user 430 and user 440 and shares access to encrypted files 406 and 408 with user 430.

As used herein, the term "file" may refer to any suitable unit of information that may be stored at a third-party storage system. For example, the term "file" may refer to a data object, data segment, portion of a data stream, database, database entry, and/or an electronic document. The term "encrypted file," as used herein, may refer to any file that has been encrypted.

As used herein, the phrase "third-party storage system" may refer to any type or form of storage system, including a cloud-based storage system, that is capable of storing data on behalf of one or more users and/or one or more groups of users. Examples of third-party storage services include, without limitation, CARBONITE, ICLOUD, DROPBOX, GOOGLE DRIVE, MICROSOFT SKYDRIVE, and NORTON ZONE.

The term "user," as used herein, may refer to any data owner and/or any entity capable of accessing data stored at a third-party storage system. In some examples, the term "user" may also refer to an account identifier used, e.g., to identify data owned by an entity, to secure data owned by an entity for use by the entity, and/or to identify data to which access has been shared with the entity.

Figure 4:
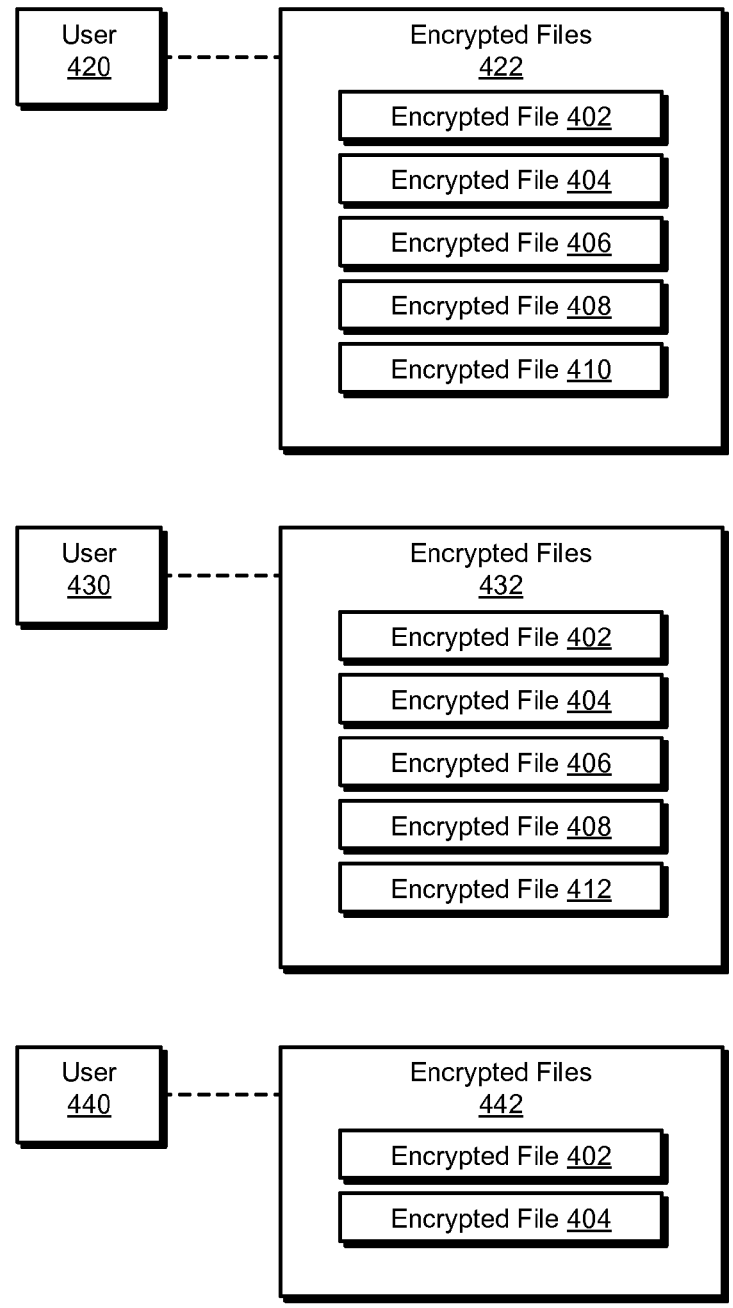
FIG. 4 is a block diagram of exemplary users and user data.
Figure 5:
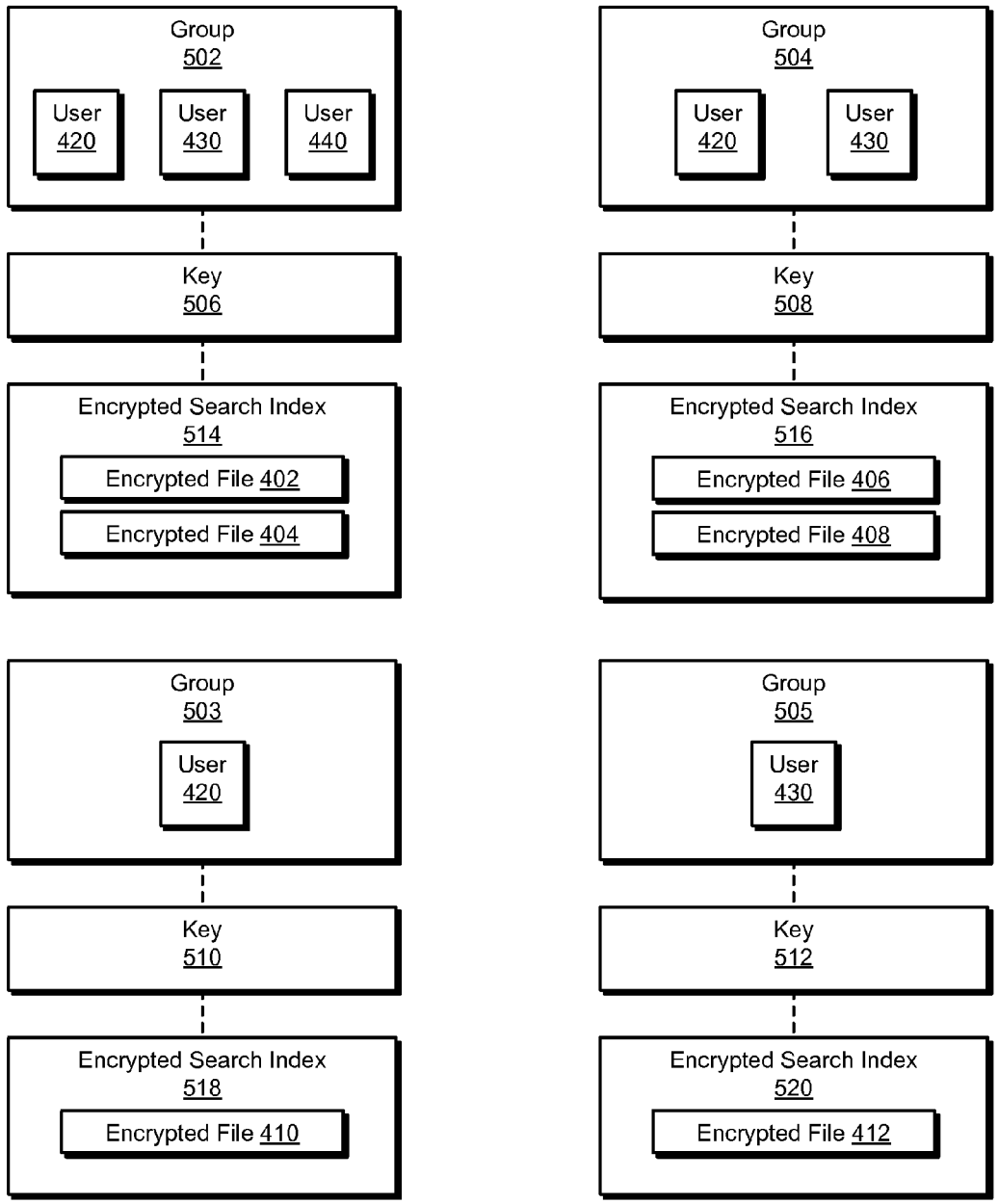
FIG. 5 is a block diagram of exemplary user groups and shared encrypted search indexes.
Figure 6:
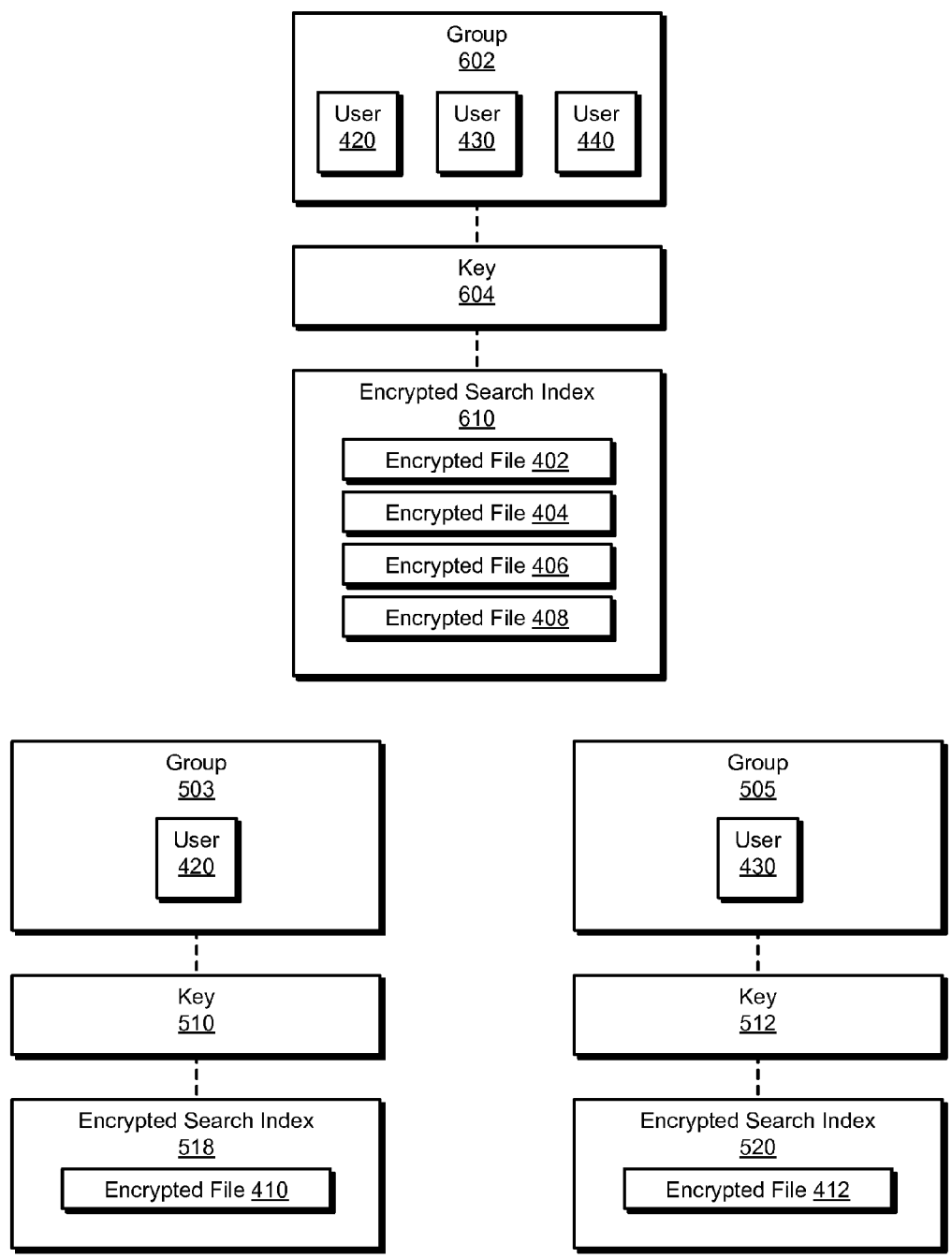
FIG. 6 is a block diagram of exemplary user groups and shared encrypted search indexes.
Figure 7:
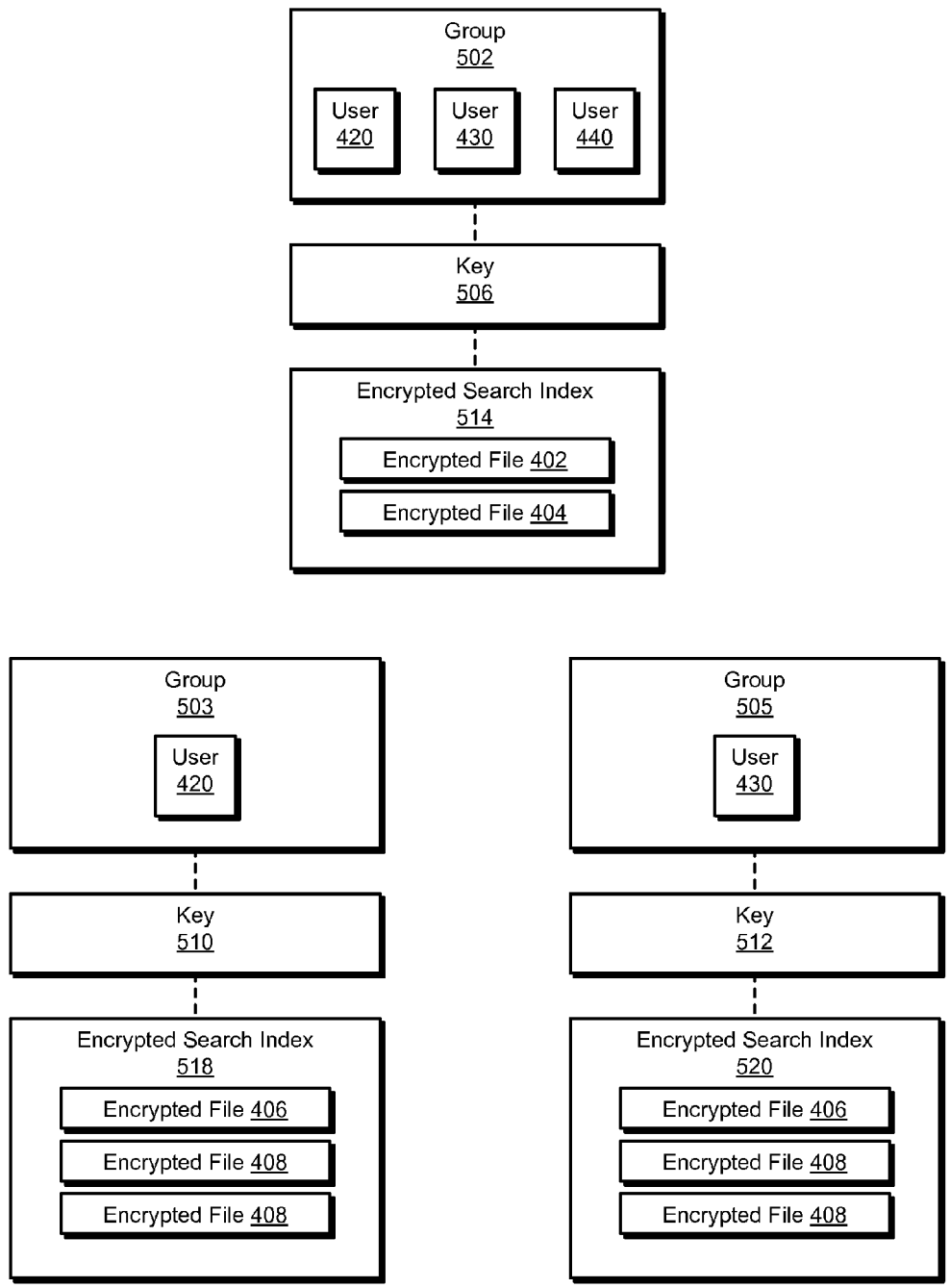
FIG. 7 is a block diagram of exemplary user groups and shared encrypted search indexes.

In some examples, the systems described herein may store a user's files to a third-party storage system in an encrypted state to prevent unauthorized access of the files by other users, intruders (e.g., entities not authorized to access files stored within the third-party storage system), and/or administrators of the third-party storage system. In general, the systems described herein may prevent unauthorized access of files stored to third-party storage systems by (1) encrypting the files with cryptographic keys and (2) limiting which users are provided access to these cryptographic keys. FIG. 4 illustrates three users who have access to one or more files stored on a third-party storage system. As shown, user 420 may have access to encrypted files 422 (i.e., encrypted files 402-410), user 430 may have access to encrypted files 432 (i.e., encrypted files 402-408 and 412), and user 440 may have access to encrypted files 442 (i.e., encrypted files 402 and 404).

In some examples, the systems described herein may enable a group of users to share access to encrypted files. For example, the systems described herein may enable a user to upload a file to a third-party storage system and share the file with zero, one, or many other users. Using FIG. 4 as an example, the systems describe herein may enable users 420, 430, and 440 to share encrypted files 402 and 404, enable users 420 and 430 to share encrypted files 406 and 408, enable user 420 to share encrypted file 410 with no other users, and enable user 430 to share encrypted file 412 with no other users.

As used herein, the phrase "group of users" may generally refer to any combination of two or more users that share access to at least one encrypted file. Additionally or alternatively, the phrase "group of users" may refer to a set of users for which there is at least one encrypted file accessible to all users in the set of users and no one else. Examples of groups of users include group 210 in FIG. 2, groups 502-505 in FIG. 5, and group 602 in FIG. 6. In some examples, the systems described herein may designate a unique cryptographic key for each group of users that is only accessible to users in the group of users and that may be used to encrypt and/or decrypt files and/or search indexes shared by the group of users. Using FIG. 5 as an example, compiling module 112 may designate key 506 for group 502, key 508 for group 504, key 510 for group 503, and key 512 for group 505.

In some examples, the systems described herein may maintain search indexes for searching encrypted files based on groups of users who share access to the encrypted files. As used herein, the term "search index" may refer to any collection of information that may enable one or more users of a third-party storage system to search all or a portion of the encrypted files stored at the third-party storage system. In some examples, the phrase "search index," may refer to one or more search-index files to which a search engine stores search-index data. In general, the systems described herein may enable a user to search for a keyword (or keywords) in all files that the user can access. As will be explained in greater detail below, search indexes may map keywords to information about the encrypted files that contain the keywords.

In general, the systems described herein may encrypt search indexes with cryptographic keys to prevent data leaks. In some examples, the systems described herein may limit which users and/or groups of users have access to a search index by limiting which users and/or groups of users have access to these cryptographic keys. In one example, the systems described herein may generate at least one search index for searching the encrypted files to which a group of users share access and may limit access to the search index by encrypting the search index with a cryptographic key designated for the group of users. Using FIG. 5 as an example, compiling module 112 may generate a search index for searching encrypted files 402 and 404 to which the users of group 502 share access and may limit access to the search index by encrypting the search index with key 506 designated for group 502 (e.g., a cryptographic key to which each user of group 502 has access).

The systems described herein may compile encrypted search indexes for groups of users in a variety of ways. In one example, compiling module 112 may compile encrypted search indexes by (1) identifying each group of users that share access to one or more encrypted files, (2) identifying every encrypted file to which every user in the group of users shares access, (3) compiling a search index for searching the identified encrypted files, and (4) encrypting, with a key designated for the group of users and to which each user in the group of user has access, the search index. Using FIG. 5 as an example, compiling module 112 may compile encrypted search index 514 by (1) identifying group 502, (2) determining that each user in group 502 shares access to encrypted files 402 and 404, (3) compiling a search index for searching encrypted files 402 and 404, and (4) encrypting the search index with key 506 (e.g., a key designated for group 502 to which each user in group 502 has access). Similarly, compiling module 112 may compile encrypted search index 516 by (1) identifying group 504, (2) determining that each user in group 504 shares access to encrypted files 406 and 408, (3) compiling a search index for searching encrypted files 406 and 408, and (4) encrypting the search index with key 508 (e.g., a key designated for group 504 to which each user in group 504 has access).

In some examples, a group of users may only have a single user, and the systems described herein may compile an encrypted search index for the group of users by (1) identifying every encrypted file to which the user in the group of users has access, (2) compiling a search index for searching the identified encrypted files, and (3) encrypting, with a key designated for the group of users and to which the user in the group of users has access, the search index. Using FIG. 5 as an example, compiling module 112 may compile encrypted search index 518 by (1) determining that encrypted file 410 is accessible to only user 420, (2) compiling a search index for searching encrypted file 410, and (3) encrypting the search index with key 510 (e.g., a key designated for group 503 to which user 420 has access). Similarly, compiling module 112 may compile encrypted search index 520 by (1) determining that encrypted file 412 is accessible to only user 430, (2) compiling a search index for searching encrypted file 412, and (3) encrypting the search index with key 512 (e.g., a key designated for group 505 to which user 430 has access).

In some examples, compiling module 112 may combine two or more groups of users and/or their search indexes if, for example, the two or more groups of users have in common a predetermined number of users. In one example, compiling module 112 may combine two or more groups of users into a new group of users. Additionally or alternatively, compiling module 112 may combine two or more groups of users by adding one or more groups of users to an existing group of users. Using FIGS. 5 and 6 as an example, compiling module 112 may combine groups 502 and 504 into group 602 and encrypted search indexes 514 and 516 into encrypted search index 610 in response to determining that groups 502 and 504 have two common users. In one example, compiling module 112 may compile encrypted search index 610 by (1) combining unencrypted versions of encrypted search indexes 514 and 516 and (2) encrypting the resulting search index with key 604 (e.g., a key designated for group 602 to which each user in group 602 has access). By combining the search indexes of two or more groups of users, the systems described herein may reduce the number of search indexes that must be accessed when performing searches for users and/or may reduce the number of lookup keys that must be generated for searching multi-tenant search indexes.

In some examples, the systems described herein may compile search indexes such that an encrypted file is not indexed by more than one search index. Alternatively, the systems described herein may compile search indexes such that an encrypted file may be indexed in more than one search index. In at least one example, the systems described herein may include an encrypted file in multiple search indexes in order to reduce the number of search indexes that must be accessed when performing searches for users.

In some examples, compiling module 112 may eliminate a group of users and/or its search index if, for example, the group of users shares less than a predetermined number of files. In one example, compiling module 112 may eliminate a group of users and/or its search index by redundantly indexing the files shared by the group of users in the search indexes of other groups of users of which the users of the group of users are members. Using FIGS. 5 and 7 as an example, compiling module 112 may index encrypted files 406 and 408 using encrypted search indexes 518 and 520 instead of encrypted search index 516 so that encrypted search index 516 does not need to be searched when performing searches for user 420 or user 430. By eliminating groups of users and/or their search indexes, the systems described herein may reduce the number of search indexes that must be accessed when performing searches for users and/or lookup keys that must be generated for searching multi-tenant search indexes.

Returning to FIG. 3 at step 304, one or more of the systems described herein may identify an encrypted search index compiled for and shared by the group of users that enables the one or more encrypted files to be searched. For example, identifying module 106 may, as part of server 206 in FIG. 2, identify encrypted search index 220 compiled for and shared by group 210 that enables encrypted files 222 to be searched.

In some examples, a user may be a member of more than one group of users and the user's files may be indexed in the encrypted search indexes compiled for these groups of users. As such, identifying module 106 may identify each search index that indexes the user's files by (1) identifying each group of users to which the user belongs and (2) identifying the encrypted search indexes compiled for the identified groups of users. Using FIG. 5 as an example, identifying module 106 may identify encrypted search indexes 514, 516, and 518 in response to receiving a search request from user 420, encrypted search indexes 514, 516, and 520 in response to receiving a search request from user 430, and encrypted search index 514 in response to receiving a search request from user 440.

At step 306, one or more of the systems described herein may decrypt the encrypted search index with a key with which each user within the group of users has access. For example, decrypting module 108 may, as part of server 206 in FIG. 2, generate decrypted search index 224 by decrypting encrypted search index 220 with key 218.

In general, the systems described herein may decrypt each encrypted search index that indexes a user's files using the cryptographic key of the group of users for which the encrypted search index was compiled and to which the user has access. Using FIG. 5 as an example, decrypting module 108 may decrypt encrypted search indexes 514, 516, and 518 in response to receiving a search request from user 420 using keys 506, 508, and 510, respectively. Similarly, decrypting module 108 may decrypt encrypted search indexes 514, 516, and 520 in response to receiving a search request from user 430 using keys 506, 508, and 512, respectively. Likewise, decrypting module 108 may decrypt encrypted search index 514 in response to receiving a search request from user 440 using key 506.

At step 308, one or more of the systems described herein may use the decrypted search index to respond to the request from the user. For example, searching module 110 may, as part of server 206 in FIG. 2, use decrypted search index 224 to respond to request 208.

In general, the systems described herein may use a decrypted version of each encrypted search index that indexes a user's files to respond to the user's search requests. Using FIG. 5 as an example, searching module 110 may use decrypted versions of encrypted search indexes 514, 516, and 518 to respond to search requests from user 420. Similarly, searching module 110 may use decrypted versions of encrypted search indexes 514, 516, and 520 to respond to search requests from user 430. Likewise, searching module 110 may use a decrypted version of encrypted search index 514 to respond to search requests from user 440.

In some examples, each user that has access to a shared encrypted search index may not have access to each encrypted file indexed by the encrypted search index. Using FIG. 6 as an example, user 440 may have access to encrypted search index 610 but may not have access to encrypted files 406 and 408. For at least this reason, searching module 110 may exclude information about encrypted files to which a user does not have access when responding to search requests from the user. Upon completion of step 308, exemplary method 300 in FIG. 3 may terminate.

Figure 8:
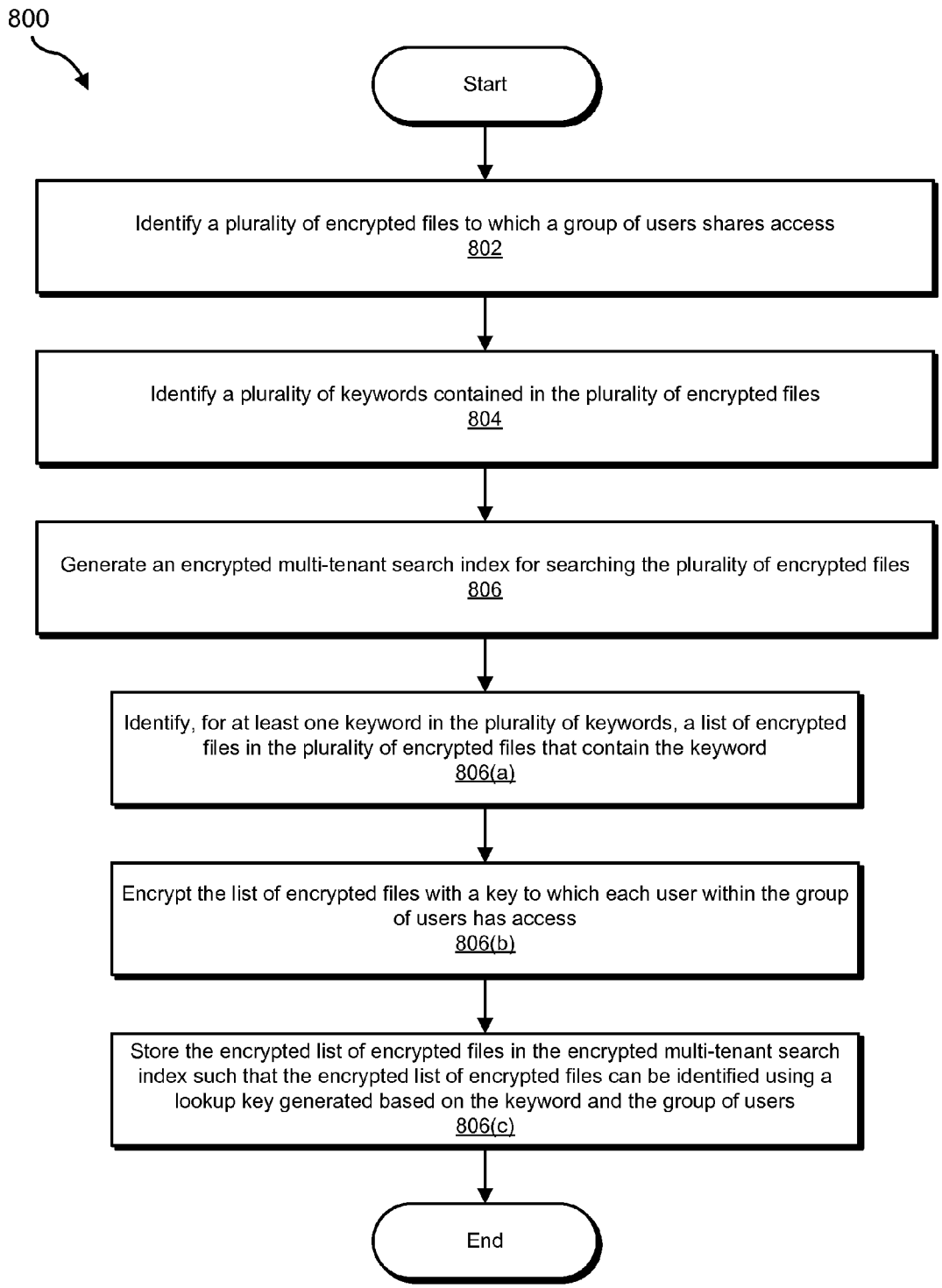
FIG. 8 is a flow diagram of an exemplary method for generating encrypted multi-tenant search indexes for searching shared encrypted files on third-party storage systems.

In some examples, the systems described herein may maintain one or more large multi-tenant search indexes for searching files stored at a third-party storage system and may limit access to the multi-tenant search indexes using cryptographic keys that are shared amongst groups of users. FIG. 8 is a flow diagram of an exemplary computer-implemented method 800 for generating encrypted multi-tenant search indexes for searching shared encrypted files on third-party storage systems. The steps shown in FIG. 8 may be performed by any suitable computer-executable code and/or computing system. In some embodiments, the steps shown in FIG. 8 may be performed by one or more of the components of system 100 in FIG. 1, system 200 in FIG. 2, computing system 1110 in FIG. 11, and/or portions of exemplary network architecture 1200 in FIG. 12.

As illustrated in FIG. 8, at step 802 one or more of the systems described herein may identify a plurality of encrypted files to which a group of users shares access. Using FIG. 9 as an example, compiling module 112 may, as part of server 206 in FIG. 2, identify encrypted files 902 to which group 502 shares access. The systems described herein may perform step 802 in a variety of contexts. In one example, compiling module 112 may identify encrypted files to which a group of users shares access as part of identifying the group of users. In some examples, compiling module 112 may identify encrypted files as they are shared amongst users.

In some examples, compiling module 112 may identify a plurality of encrypted files to which a group of users shares access by (1) identifying encrypted files and (2) identifying the groups of users that share access to the encrypted files.

At step 804, one or more of the systems described herein may identify a plurality of keywords contained in the plurality of encrypted files. Using FIG. 9 as an example, compiling module 112 may, as part of server 206 in FIG. 2, identify keywords 904 and 906 that are contained in encrypted files 902.

As used herein, the term "keyword" generally refers to any information associated with an encrypted file that may be used to identify the encrypted file. Examples of keywords include, without limitation, words, phrases, and/or strings of characters contained in or associated with an unencrypted version of an encrypted file.

The systems described herein may perform step 804 in any suitable manner. For example, compiling module 112 may extract one or more keywords from the contents or file name of an unencrypted version of each encrypted file identified as part of step 802. Compiling module 112 may decrypt the encrypted files before identifying the keywords contained in the encrypted files. Alternatively, compiling module 112 may identify keywords contained in files before the files are encrypted. For example, compiling module 112 may identify keywords contained in encrypted files as part of generating and/or storing the encrypted files.

At step 806, one or more of the systems described herein may generate an encrypted multi-tenant search index for searching the plurality of encrypted files. Using FIG. 9 as an example, compiling module 112 may, as part of server 206 in FIG. 2, generate encrypted search index 910 for searching encrypted files 902.

As used herein, the term "multi-tenant search index" may refer to any collection of information that may enable multiple users and/or groups of users of a third-party storage system to search all or a portion of the encrypted files stored at the third-party storage system. As will be explained in greater detail below, multi-tenant search indexes may map a keyword to information about the encrypted files that contain the keyword. In addition, multi-tenant search indexes may map a group of users to information about the encrypted files that they share. In some examples, the portion of a multi-tenant search index that is accessible to a group of users may represent a search index compiled for the group of users that enables the encrypted files to which the group of users share access to be searched.

The systems described herein may generate an encrypted multi-tenant search index by performing one or more steps (e.g., steps 806(a), 806(b), and 806(c)). For example, at step 806(a), one or more of the systems described herein may identify, for at least one keyword in the plurality of keywords, a list of encrypted files in the plurality of encrypted files that contain the keyword. Using FIG. 9 as an example, compiling module 112 may generate list 910 that may include information about which of encrypted files 902 contains keyword 904 and may generate list 912 that may include information about which of encrypted files 902 contains keyword 906.

As used herein, the phrase "list of encrypted files" may generally refer to a collection of information about one or more encrypted files that contain a particular keyword. In some examples, a list of encrypted files may include a reference (e.g., a file pointer) to each encrypted file that contains a keyword, information that indicates the location of the keyword in an unencrypted version of each encrypted file in the list of encrypted files, and/or the number of times the keyword is found in an unencrypted version of each encrypted file. In some examples, compiling module 112 may compile a list of encrypted files as a linked list or an array.

At step 806(b), one or more of the systems described herein may encrypt the list of encrypted files with a key to which each user within the group of users has access. Using FIG. 9 as an example, compiling module 112 may generate encrypted list 914 by encrypting list 910 with key 506 and may generate encrypted list 916 by encrypting list 912 with key 506. In general, compiling module 112 may encrypt lists of encrypted files with a unique encryption key designated for the group of users.

The systems described herein may encrypt lists of encrypted files using any suitable cipher. As used herein, the term "cipher" generally refers to any algorithm for performing encryption and/or decryption. For example, a cipher may include a set of defined steps that can be followed as a procedure for encoding data. A cipher may be a block cipher, a stream cipher, and/or any other type of cipher that uses an encryption key and an initialization vector to encode data. Compiling module 112 may use a block cipher implemented in any suitable type of block cipher mode, including, but not limited to, Electronic Code Book (ECB), Cipher Block Chaining (CBC), Propagating Cipher-Block Chaining (PCBC), Output Feedback Mode (OFB), Integrated Counter Mode (ICM), Cipher Feedback Mode (CFB), Counter Mode (CTR), Counter Mode with Randomized Counter (CTR$), etc.

In some examples, compiling module 112 may use the same cryptographic key to encrypt multiple lists of encrypted files within a search index without sacrificing security by using a block cipher implemented in CTR$ mode to encrypt the lists of encrypted files. In some examples, the starting value of the randomized counter used by a block cipher implemented in CTR$ mode may be equal to a random initialization vector.

Compiling module 112 may generate a random initialization vector for use in encrypting a list of encrypted files in a variety of ways. In one example, compiling module 112 may generate a random initialization vector for encrypting a list of encrypted files by applying a pseudo-random function (PRF) (e.g., any function that takes an input and produces a corresponding output that appears random, such as pseudo-random function 918 in FIG. 9) to the keyword associated with the list of encrypted files. By generating a random initialization vector from the keyword associated with a list of encrypted files, the systems and methods described herein may not need to store the initialization vector to later decrypt the list of encrypted files because the initialization vector may be regenerated each time a search involving the keyword is performed.

At step 806(c), one or more of the systems described herein may store the encrypted list of encrypted files in the encrypted multi-tenant search index such that the encrypted list of encrypted files can be identified using a lookup key generated based on the keyword and the group of users. Using FIG. 9 as an example, compiling module 112 may store encrypted list 914 and encrypted list 916 in encrypted search index 908 such that encrypted list 914 and encrypted list 916 may be accessed using lookup key 920 and lookup key 922, respectively. By basing lookup-keys on groups of users, the systems described herein may distinguish the encrypted lists of encrypted files of one group of users from the encrypted lists of encrypted files of another group of users.

Figure 9:
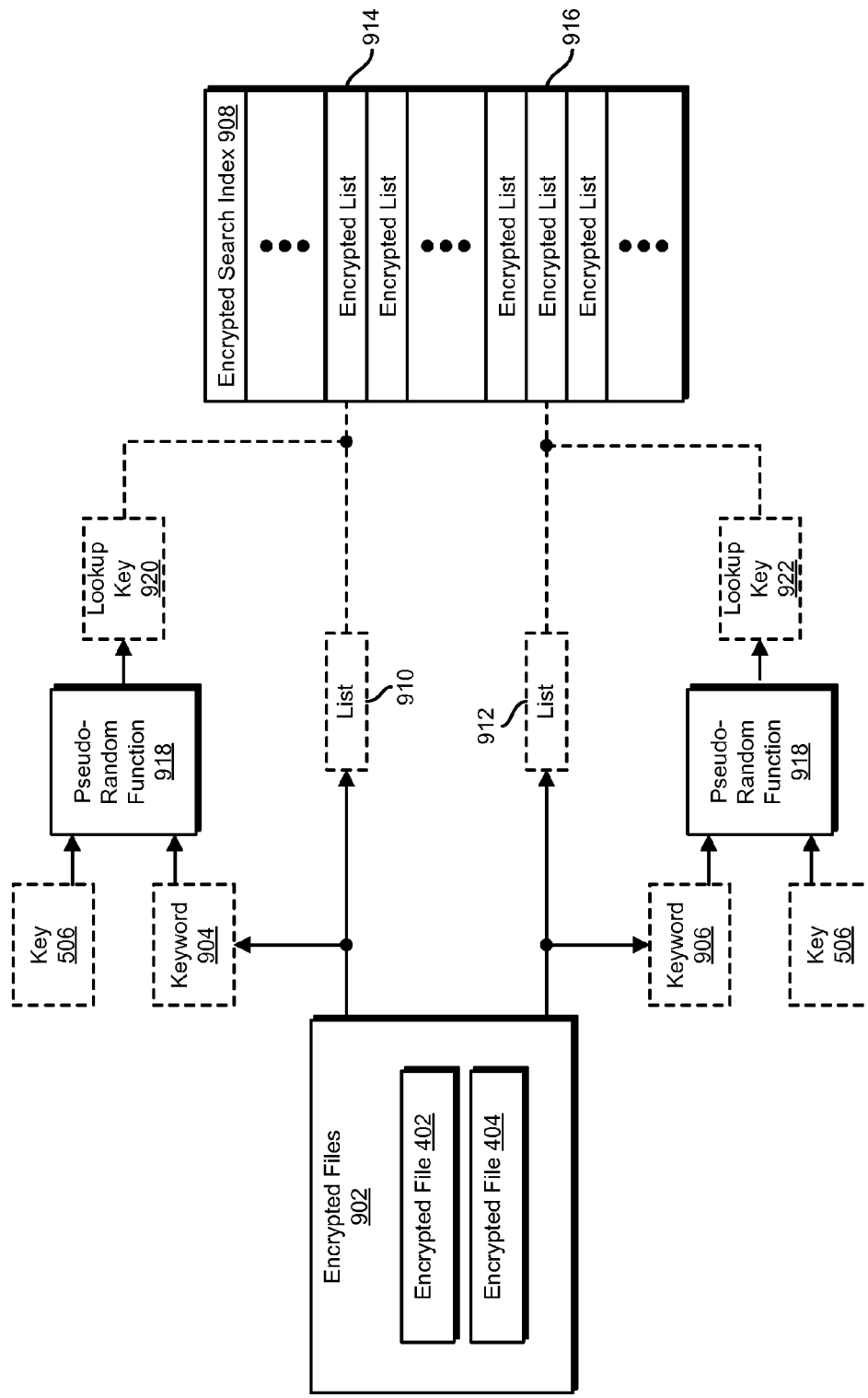
FIG. 9 is a block diagram of an exemplary system for generating encrypted multi-tenant search indexes for searching shared encrypted files on third-party storage systems.

The systems described herein may perform step 812 in any suitable manner. In general, compiling module 112 may store encrypted lists of encrypted files in any data structure that maps lookup keys to the encrypted lists of encrypted files. For example, compiling module 112 may store encrypted lists of encrypted files in a hash table (e.g., as illustrated in FIG. 9) or a tree. For example, compiling module 112 may store an encrypted list of encrypted files as a hash table entry such that (1) the key of the hash-table entry is equal to a value generated by applying a pseudo-random function to a combination of the keyword associated with the encrypted list of encrypted files and the cryptographic key used to encrypt the encrypted list of encrypted files (e.g., the key to which each user within the group of users associated with the encrypted list of encrypted files has access) and (2) the value of the hash-table entry is the encrypted list of encrypted files.

Using FIG. 9 as an example, compiling module 112 may store encrypted list 914 as a hash table entry in encrypted search index 908 such that the key of the hash-table entry is equal to lookup key 920 generated by applying pseudo-random function 918 to a combination of keyword 904 and key 506 and the value of the hash-table entry is encrypted list 914. Similarly, compiling module 112 may store encrypted list 912 as another hash table entry in encrypted search index 908 such that the key of the hash-table entry is equal to lookup key 922 generated by applying pseudo-random function 918 to a combination of keyword 906 and key 506 and the value of the hash-table entry is encrypted list 916. Upon completion of step 806(c), exemplary method 800 in FIG. 8 may terminate.

In some examples, the systems described herein may perform steps 802-806 for each group of users that share access to encrypted files on a third-party storage system. Using FIG. 5 as an example, compiling module 112 may perform steps 802-806 for groups 502-505. In this example, keys 506, 508, 510, and 512 may be used to generate lookup keys for storing and/or accessing encrypted lists of encrypted files associated with groups 502, 504, 503, and 505, respectively.

In general, the systems described herein may use an encrypted multi-tenant search index to respond to a keyword-based search request from a user by (1) identifying each group of users to which the user belongs, (2) identifying the cryptographic keys designated for the identified groups of users, (3) generating lookup keys using the keywords contained in the search request and the cryptographic keys, (4) accessing encrypted lists of encrypted files within the encrypted multi-tenant search index using the lookup keys, (5) decrypting the encrypted lists of encrypted files using the cryptographic keys, and (6) using unencrypted versions of the encrypted lists of encrypted files to respond to the request from the user.

Figure 10:
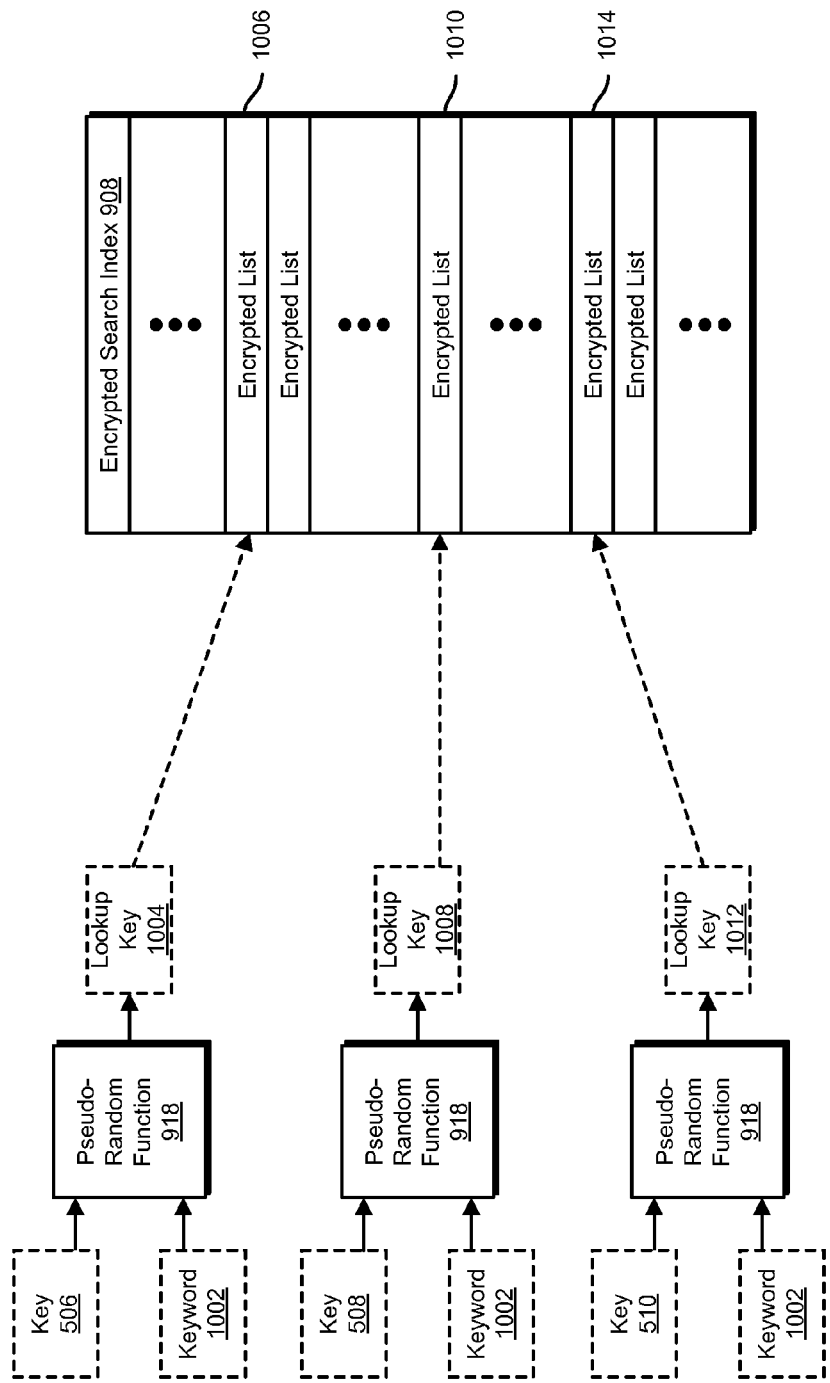
FIG. 10 is a block diagram of an additional exemplary system for searching shared encrypted files on third-party storage systems.

FIG. 10 illustrates how the systems described herein may use an encrypted multi-tenant search index to respond to a keyword-based search request from a user. In this example, receiving module 104 may have received a request from user 420 to search encrypted files 422 for keyword 1002. In response to this request, identifying module 106 may identify the encrypted lists of encrypted files to which user 420 has access by generating lookup keys 1004, 1008, and 1012. As shown, identifying module 106 may generate lookup key 1004 by applying pseudo-random function 918 to a combination of keyword 1002 and key 506, lookup key 1008 by applying pseudo-random function 918 to a combination of keyword 1002 and key 508, and lookup key 1012 by applying pseudo-random function 918 to a combination of keyword 1002 and key 510. Identifying module 106 may then identify encrypted lists 1006, 1010, and 1014 using lookup keys 1004, 1008, and 1012, respectively. Decrypting module 108 may then decrypt encrypted lists 1006, 1010, and 1014, and searching module 110 may use the resulting decrypted lists to respond to the request from user 420.

As explained above, by creating a search index for searching one or more encrypted files to which a group of users shares access and enabling each user in the group of users to access the search index, the systems and methods described herein may reduce the number of search indexes that are used to search encrypted files on third-party storage systems. Furthermore, in some examples, by maintaining large multi-tenant search indexes and limiting access to the multi-tenant search indexes using cryptographic keys that are shared by groups of users, these systems and methods may enable secure indexing and searching of shared encrypted files.

Figure 11:
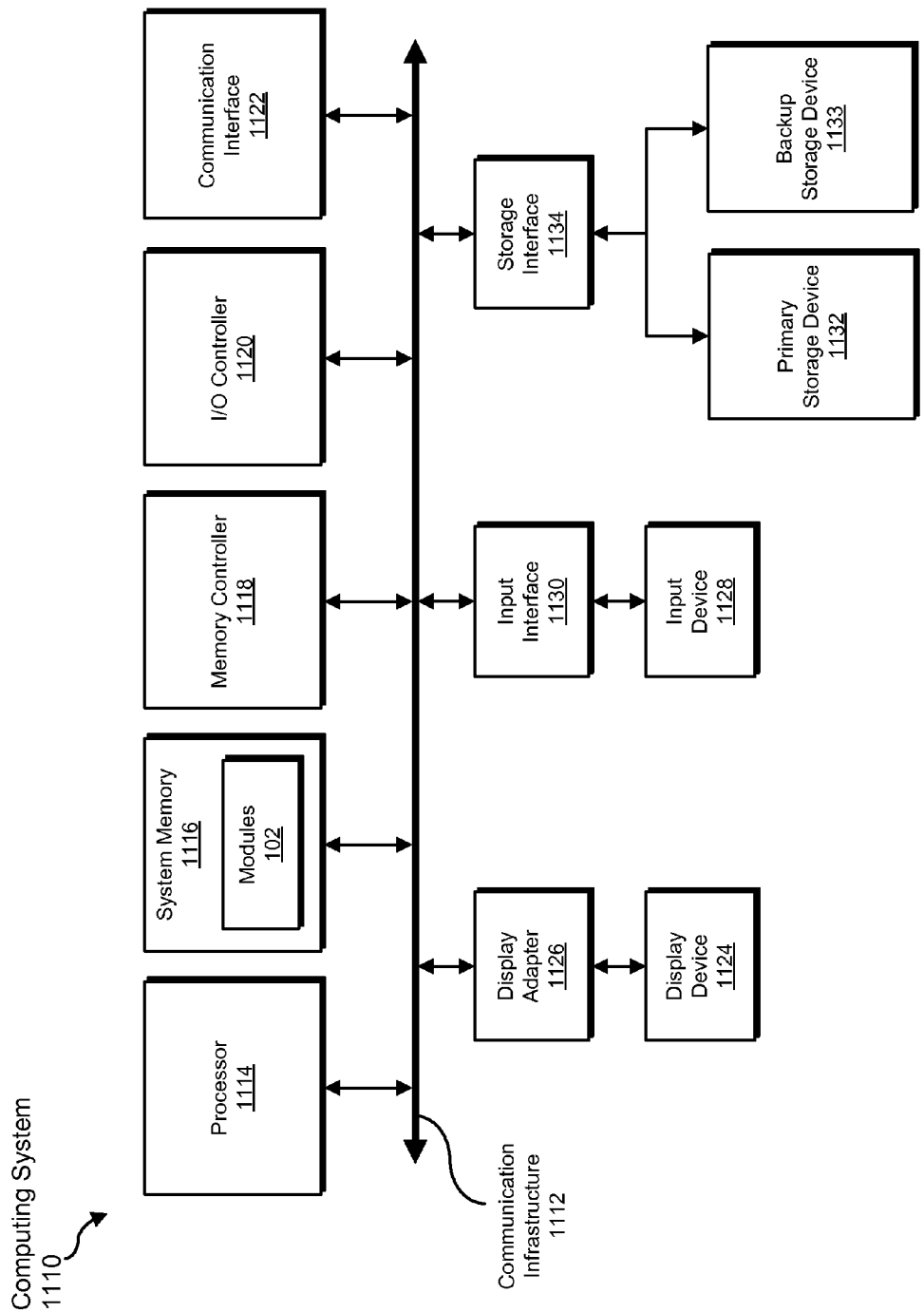
FIG. 11 is a block diagram of an exemplary computing system capable of implementing one or more of the embodiments described and/or illustrated herein.

FIG. 11 is a block diagram of an exemplary computing system 1110 capable of implementing one or more of the embodiments described and/or illustrated herein. For example, all or a portion of computing system 1110 may perform and/or be a means for performing, either alone or in combination with other elements, one or more of the steps described herein (such as one or more of the steps illustrated in FIG. 3). All or a portion of computing system 1110 may also perform and/or be a means for performing any other steps, methods, or processes described and/or illustrated herein.

Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of physical processing unit (e.g., a hardware-implemented central processing unit) capable of processing data or interpreting and executing instructions. In certain embodiments, processor 1114 may receive instructions from a software application or module. These instructions may cause processor 1114 to perform the functions of one or more of the exemplary embodiments described and/or illustrated herein.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, one or more of modules 102 from FIG. 1 may be loaded into system memory 1116.

In certain embodiments, exemplary computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI Express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution.

As illustrated in FIG. 11, computing system 1110 may also include at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also include at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device.

As illustrated in FIG. 11, exemplary computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a solid state drive, a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an Application Specific Integrated Circuit (ASIC) adapted to implement one or more of the exemplary embodiments disclosed herein.

Figure 12:
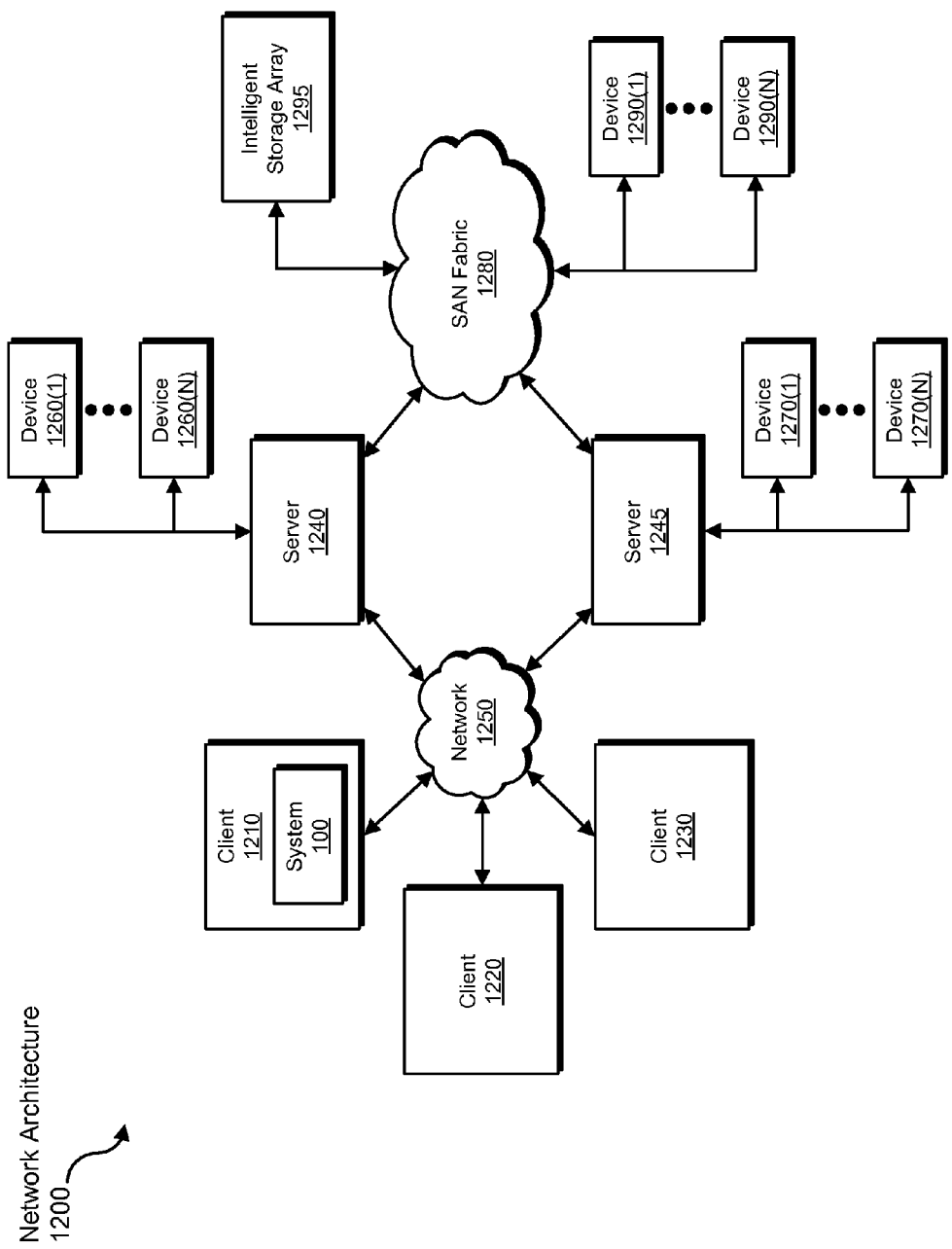
FIG. 12 is a block diagram of an exemplary computing network capable of implementing one or more of the embodiments described and/or illustrated herein.

FIG. 12 is a block diagram of an exemplary network architecture 1200 in which client systems 1210, 1220, and 1230 and servers 1240 and 1245 may be coupled to a network 1250. As detailed above, all or a portion of network architecture 1200 may perform and/or be a means for performing, either alone or in combination with other elements, one or more of the steps disclosed herein (such as one or more of the steps illustrated in FIG. 3). All or a portion of network architecture 1200 may also be used to perform and/or be a means for performing other steps and features set forth in the instant disclosure.

Client systems 1210, 1220, and 1230 generally represent any type or form of computing device or system, such as exemplary computing system 1110 in FIG. 11. Similarly, servers 1240 and 1245 generally represent computing devices or systems, such as application servers or database servers, configured to provide various database services and/or run certain software applications. Network 1250 generally represents any telecommunication or computer network including, for example, an intranet, a WAN, a LAN, a PAN, or the Internet. In one example, client systems 1210, 1220, and/or 1230 and/or servers 1240 and/or 1245 may include all or a portion of system 100 from FIG. 1.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent Network-Attached Storage (NAS) devices configured to communicate with servers 1240 and 1245 using various protocols, such as Network File System (NFS), Server Message Block (SMB), or Common Internet File System (CIFS).

Servers 1240 and 1245 may also be connected to a Storage Area Network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to exemplary computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the exemplary embodiments disclosed herein may also be encoded as a computer program, stored in server 1240, run by server 1245, and distributed to client systems 1210, 1220, and 1230 over network 1250.

As detailed above, computing system 1110 and/or one or more components of network architecture 1200 may perform and/or be a means for performing, either alone or in combination with other elements, one or more steps of an exemplary method for searching shared encrypted files on third-party storage systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to search encrypted files stored at a third-party storage system, transform the request into a decrypted search index that enables the encrypted files to be searched, output a result of the transformation to the third-party storage system, use the result of the transformation to search the encrypted files, and store the result of the transformation to the third-party storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for searching shared encrypted files on third-party storage systems, at least a portion of the method being performed by a computing device comprising at least one processor, the method comprising:
receiving, from a client-side computing device of a first user by a server-side computing system, a request from the first user to share with a second user access to at least one encrypted document to which the first user has access;
providing, in response to the request from the first user by the server-side computing system, the second user with access to the encrypted document;
receiving, from a client-side computing device of the second user by the server-side computing system, a request from the second user to search the encrypted document to which the second user has access, wherein:
a group of users shares access to the encrypted document;
the group of users comprises the first user and the second user;
identifying, in response to the request from the second user, at least one encrypted search index compiled for and shared by the group of users that enables the encrypted document to be searched, wherein each user within the group of users has access to a key with which the encrypted search index may be decrypted;
decrypting, by the server-side computing system, the encrypted search index with the key;
using, by the server-side computing system, the decrypted search index to respond to the request from the second user, wherein the server-side computing system comprises the computing device.

2. The method of claim 1, wherein:
at least one additional group of users comprises the second user;
the additional group of users shares access to at least one additional encrypted document;
the request from the second user comprises a request to search the encrypted document and the additional encrypted document;
identifying the encrypted search index comprises identifying an additional encrypted search index compiled for and shared by the additional group of users that enables the additional encrypted document to be searched;
each user within the additional group of users has access to an additional key with which the additional encrypted search index may be decrypted;
decrypting the encrypted search index comprises decrypting the additional encrypted search index with the additional key;
using the decrypted search index to respond to the request from the second user comprises using the decrypted search index and the additional decrypted search index to respond to the request from the second user.

3. The method of claim 1, further comprising compiling the encrypted search index by:
identifying every encrypted document to which every user in the group of users shares access;
compiling a search index for searching every encrypted document to which every user in the group of users shares access;
encrypting, with the key, the search index for searching every encrypted document to which every user in the group of users shares access.

4. The method of claim 3, wherein the search index for searching every encrypted document to which every user in the group of users shares access is the only search index for searching each encrypted document to which every user in the group of users shares access.

5. The method of claim 1, further comprising compiling the encrypted search index by:
identifying a plurality of encrypted documents to which at least one user in the group of users has access, wherein the plurality of encrypted documents comprises:
the encrypted document;
at least one encrypted document to which the second user does not have access;
compiling a search index for searching the plurality of encrypted documents;
encrypting, with the key, the search index for searching the plurality of encrypted documents.

6. The method of claim 5, wherein:
the request from the second user comprises a keyword;
using the decrypted search index to respond to the request from the second user comprises:
using the decrypted search index to determine that the encrypted document contains the keyword;
ensuring that the second user has access to the encrypted document;
responding to the request from the second user with at least one of:
information about the encrypted document;
the encrypted document.

7. The method of claim 1, further comprising:
identifying at least one additional document to which the second user shares access with an additional user;
compiling a first additional search index for searching at least the additional encrypted document;
compiling a second additional search index for searching at least the additional encrypted document;
encrypting the first additional search index with a first additional key to which the second user but not the additional user has access;
encrypting the second additional search index with a second additional key to which the additional user but not the second user has access;
using the encrypted first additional search index to respond to the request from the second user.

8. The method of claim 1, further comprising compiling the encrypted search index by:
identifying a plurality of encrypted documents to which the group of users shares access, wherein the plurality of encrypted documents comprises the encrypted document;
identifying a plurality of keywords, wherein each of the plurality of keywords is contained in at least one of the plurality of encrypted documents;
generating an encrypted multi-tenant search index for searching the plurality of encrypted documents by:
identifying, for at least one keyword in the plurality of keywords, a list of encrypted documents in the plurality of encrypted documents that contain the keyword;
encrypting the list of encrypted documents with the key;
storing the encrypted list of encrypted documents in the encrypted multi-tenant search index such that the encrypted list of encrypted documents can be identified using a lookup key generated based at least in part on the keyword and the group of users.

9. The method of claim 8, wherein:
compiling the encrypted search index further comprises:
identifying an additional plurality of encrypted documents to which an additional group of users shares access;
identifying an additional plurality of keywords that are contained in at least one of the additional plurality of encrypted documents;
generating the encrypted multi-tenant search index further comprises:
identifying, for at least one additional keyword in the additional plurality of keywords, an additional list of encrypted documents from the additional plurality of encrypted documents that contain the additional keyword;
encrypting the additional list of encrypted documents with an additional key to which each user in the additional group of users shares access;
storing the additional encrypted list of encrypted documents in the encrypted multi-tenant search index such that the additional encrypted list of encrypted documents can be identified using an additional lookup key generated based at least in part on the additional keyword and the additional group of users.

10. The method of claim 8, wherein the lookup key is generated using:
a pseudo-random function;
the keyword; and
the key.

11. The method of claim 8, wherein the encrypted list of encrypted documents is stored in a hash table and accessed using the lookup key.

12. The method of claim 1, wherein the encrypted search index is encrypted using a mode of operation with a randomized counter.

13. A system for searching shared encrypted files on third-party storage systems, the system comprising:
a receiving module, stored in memory, that:
receives, from a client-side computing device of a first user by a server-side computing system, a request from the first user to share with a second user access to at least one encrypted document to which the first user has access;
provides, in response to the request from the first user by the server-side computing system, the second user with access to the encrypted document;
receives, from a client-side computing device of the second user by the server-side computing system, a request from the second user to search the encrypted document to which the second user has access, wherein:
a group of users shares access to the encrypted document;
the group of users comprises the first user and the second user;
an identifying module, stored in memory, that identifies, in response to the request from the second user, at least one encrypted search index compiled for and shared by the group of users that enables the encrypted document to be searched, wherein each user within the group of users has access to a key with which the encrypted search index may be decrypted;
a decrypting module, stored in memory, that decrypts, by the server-side computing system, the encrypted search index with the key;
a searching module, stored in memory, that uses, by the server-side computing system, the decrypted search index to respond to the request from the second user;
at least one processor that executes the receiving module, the identifying module, the decrypting module, and the searching module.

14. The system of claim 13, further comprising a compiling module, stored in memory, that compiles the encrypted search index by:
identifying every encrypted document to which every user in the group of users shares access;
compiling a search index for searching every encrypted document to which every user in the group of users shares access;
encrypting, with the key, the search index for searching every encrypted document to which every user in the group of users shares access.

15. The system of claim 14, wherein the search index for searching every encrypted document to which every user in the group of users shares access is the only search index for searching each encrypted document to which every user in the group of users shares access.

16. The system of claim 13, further comprising a compiling module, stored in memory, that compiles the encrypted search index by:
identifying a plurality of encrypted documents to which at least one user in the group of users has access, wherein the plurality of encrypted documents comprises:
the encrypted document;
at least one encrypted document to which the second user does not have access;
compiling a search index for searching the plurality of encrypted documents;
encrypting, with the key, the search index for searching the plurality of encrypted documents.

17. The system of claim 16, wherein:
the request from the second user comprises a keyword;
using the decrypted search index to respond to the request from the second user comprises:
using the decrypted search index to determine that the encrypted document contains the keyword;
ensuring that the second user has access to the encrypted document;
responding to the request from the second user with at least one of:
information about the encrypted document;
the encrypted document.

18. The system of claim 13, further comprising a compiling module, stored in memory, that:
identifies at least one additional document to which the second user shares access with an additional user;
compiles a first additional search index for searching at least the additional encrypted document;
compiles a second additional search index for searching at least the additional encrypted document;
encrypts the first additional search index with a first additional key to which the second user but not the additional user has access;
encrypts the second additional search index with a second additional key to which the additional user but not the second user has access, wherein the searching module uses the encrypted first additional search index to respond to the request from the second user.

19. The system of claim 13, further comprising a compiling module, stored in memory, that compiles the encrypted search index by:

identifying a plurality of encrypted documents to which the group of users shares access, wherein the plurality of encrypted documents comprises the encrypted document;
identifying a plurality of keywords, wherein each of the plurality of keywords is contained in at least one of the plurality of encrypted documents;
generating an encrypted multi-tenant search index for searching the plurality of encrypted documents by:
identifying, for at least one keyword in the plurality of keywords, a list of encrypted documents in the plurality of encrypted documents that contain the keyword;
encrypting the list of encrypted documents with the key;
storing the encrypted list of encrypted documents in the encrypted multi-tenant search index such that the encrypted list of encrypted documents can be identified using a lookup key generated based at least in part on the keyword and the group of users.

20. A non-transitory computer-readable medium comprising one or more computer-executable instructions that, when executed by at least one processor of a computing device, cause the computing device to:
receive, from a client-side computing device of a first user by a server-side computing system, a request from the first user to share with a second user access to at least one encrypted document to which the first user has access;
provide, in response to the request from the first user by the server-side computing system, the second user with access to the encrypted document;
receive, from a client-side computing device of the second user by the server-side computing system, a request from the second user to search the encrypted document to which the second user has access, wherein:
a group of users shares access to the encrypted document;
the group of users comprises the first user and the second user;
identify, in response to the request from the second user, at least one encrypted search index compiled for and shared by the group of users that enables the encrypted document to be searched, wherein each user within the group of users has access to a key with which the encrypted search index may be decrypted;
decrypt, by the server-side computing system, the encrypted search index with the key;
use, by the server-side computing system, the decrypted search index to respond to the request from the second user, wherein the server-side computing system comprises the computing device.

\* \* \* \* \*